United States Patent [19]

Baring et al.

[11] Patent Number: 4,593,662
[45] Date of Patent: Jun. 10, 1986

[54] VALVE CONTROL OF A SUPERCHARGED FOUR-CYCLE INTERNAL COMBUSTION ENGINE

[75] Inventors: Rolf Baring, Immenstaad; Wolfgang Rudert, Langenargen; Gerd-Michael Wolters, Markdorf, all of Fed. Rep. of Germany

[73] Assignee: MTU Friedrichshafen GmbH, Fed. Rep. of Germany

[21] Appl. No.: 774,443

[22] Filed: Sep. 10, 1985

[30] Foreign Application Priority Data

Oct. 20, 1984 [DE] Fed. Rep. of Germany ....... 3438556

[51] Int. Cl.$^4$ ............................................. F02B 77/00
[52] U.S. Cl. ................................. 123/198 F; 123/432; 123/90.39
[58] Field of Search ............. 123/432, 308, 198 F, 123/315, 90.39, 90.27

[56] References Cited

U.S. PATENT DOCUMENTS

| | | | |
|---|---|---|---|
| 4,463,717 | 8/1984 | Ueno | 123/198 F |
| 4,469,061 | 9/1984 | Ajiki et al. | 123/198 F |
| 4,475,497 | 10/1984 | Honda et al. | 123/198 F |

FOREIGN PATENT DOCUMENTS

| | | | |
|---|---|---|---|
| 1243459 | 6/1967 | Fed. Rep. of Germany | 123/432 |
| 162018 | 12/1979 | Japan | 123/432 |
| 32929 | 3/1980 | Japan | 123/432 |

Primary Examiner—E. Rollins Gross
Attorney, Agent, or Firm—Craig and Burns

[57] ABSTRACT

An air flow in the combustion space which swirls or rotates about the cylinder longitudinal axis is produced for the fine distribution of the fuel by a correspondingly constructed inlet channel controlled by two inlet valves in a supercharged four-cycle internal combustion engine with direct fuel injection. With a low air mass flow, the rotary movement of the air in the combustion space is only weak and therefore prone to disturbance. An improvement is achieved by a change of the air flow in the inlet channel system. The valve actuation contains, for that purpose, an adjusting mechanism consisting of a piston-cylinder-unit fed with pressure oil, which effects in one operating function an automatic valve clearance compensation and which enables in a second operating function together with a controllable closure device in the pressure oil feed line a stoppage of one of the two inlet valves actuated in unison by the valve actuation. The reduction of the inlet cross section produces in the second operating function an increased inflow velocity of the air into the combustion space whereby at the same time the valve disk of the stopped inlet valve no longer projects interferingly into the circulating air stream.

13 Claims, 4 Drawing Figures

VALVE CONTROL OF A SUPERCHARGED FOUR-CYCLE INTERNAL COMBUSTION ENGINE

The present invention relates to a valve control of a supercharged four-cycle internal combustion engine with an inlet duct system controlled by two inlet valves and with direct fuel injection into the combustion space. As a result of the rotary movement of the air produced by the inlet channel system, a smoke-free combustion and an economic operation is achieved with supercharged four-cycle internal combustion engines. With a predetermined arrangement of an inlet channel system, a rotary movement of the air in the combustion space is achieved which is optimized for a predetermined operating range. However, it is desirable to so influence the air flowing into the combustion space that an optimum rotary movement of the air will additionally take place also for another operating range, for example, for partial load.

A valve control of the type described above is disclosed, for example, in the DE-PS No. 12 32 393, which, however, contains no means for changing the air flow in the inlet channel system.

A four-cycle internal combustion engine is disclosed in the DE-PS No. 11 71 202 in which two inlet valves control an inlet channel system constructed for producing a rotary movement of the air about the cylinder axis. This arrangement contains a pivotal flap or valve in the inlet channel system which, in its end position, closes one inlet channel branch. Even though the air flow in the inlet channel system is changed thereby, the movement of the valve coordinated to the closed-off inlet channel branch remains uninfluenced thereby. The reduction to one-half of the inlet channel system cross section which is achieved by the valve end position, would produce as such an improved rotating air movement in the combustion space with a small air mass flow rate. However, this improvement is not achieved because the inlet valve coordinated to the closed-off inlet channel branch continues to be actuated and its valve disk projecting into the cylinder during the suction stroke interferes with the produced rotary movement of the air.

Additionally, the overlap of the control periods of inlet and exhaust valves effects that the inlet channel branch located between the closed valve and the inlet valve is relieved after each working stroke together with the cylinder content to the exhaust counter-pressure. During each suction stroke, in addition to the combustion space, the inlet channel branch is filled again with precompressed charging air by way of the open inlet valve from the cylinder. The inlet channel branch closed off by the valve from the remaining inlet channel system therewith produces an undesired enlargement of the dead space volume.

It is therefore the object of the present invention to provide a valve control with a valve actuation common for two inlet valves, by means of which the aforementioned disadvantages of the prior art arrangement are avoided.

The underlying problems are solved according to the present invention in that at least for one of the inlet valves per cylinder head, the adjusting mechanism consists of a piston cylinder unit fed with pressure oil, in that a controllable closure device is arranged in the pressure oil feed line of this adjusting mechanism and in that the piston and cylinder of the adjusting mechanism possess a relative displaceability which matched to the kinematics of the valve actuation precludes the opening of the inlet valve coordinated to the adjusting mechanism. The piston cylinder-unit which corresponds in its internal construction to the known arrangement described in the DE-PS No. 949,852, acts as valve clearance compensating element for the coordinated inlet valve when the pressure oil feed line is open. With a closed pressure oil feed line, the cylinder space of the piston cylinder unit becomes pressureless after a few valve actuations. The adjusting mechanism becomes thereby yielding over a large stroke range so that it loses its supporting action. The coordinated inlet valve remains closed in this case.

The advantages achieved with the present invention reside in particular in that the rotary movement of the air in the combustion space is optimized for two operating points with full and reduced opening of the inlet cross section, in that by stopping one of the two commonly actuated inlet valves, the valve disk thereof no longer projects interferingly into the cylinder during each suction stroke with reduced inlet cross section, in that an increase of the dead space by the volume of the closed-off inlet channel branch is avoided, in that the adjusting mechanism can be integrated in a simple manner into a valve actuation common for two inlet valves and in that also with several valve-adjusting mechanisms connected to a pressure oil feed line, a rapid and synchronous response of the piston cylinder-units is achieved independently of the length of the line.

These and other objects, features and advantages of the present invention will become more apparent from the following description when taken in connection with the accompanying drawing which shows, for purposes of illustration only, two embodiments in accordance with the present invention and wherein.

Figure 1:
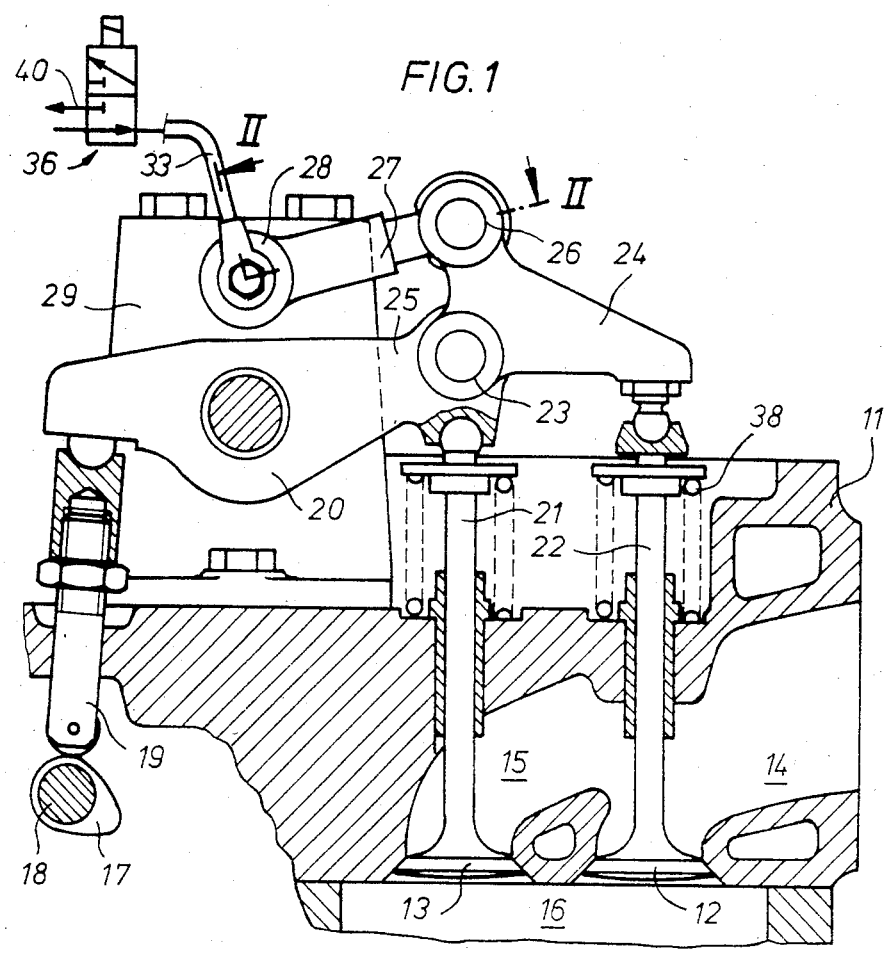
FIG. 1 is a cross-sectional view through a cylinder head with a link adjustable in length in the valve actuation in accordance with the present invention.

Referring now to the drawing wherein like reference numerals are used throughout the various views to designate like parts, the cylinder head 11 of a supercharged fourcycle internal combustion engine contains, in addition to exhaust valves (not shown), two inlet valves 12 and 13 which control an inlet channel system consisting of sections 14 and 15. The inlet channel system is so constructed that with open inlet valves 12 and 13, an intensive rotary movement about the cylinder longitudinal axis is imparted to the air flowing into the combustion space 16. Fuel is injected from an injection nozzle (not shown) directly into the swirling or circulating air flowing within the combustion space and is thereby finely distributed.

The actuation of the inlet valves 12 and 13 takes place, starting from the cam 17 of a cam shaft 18, by way of a push rod 19 to the rocker arm 20 supported at the cylinder head 11. The arm of the rocker lever or rocker arm 20 facing the inlet valves 12 and 13 is operatively connected with the valve stem 21 of the inlet valve 13. A two-armed lever 24 is pivotally connected at the rocker lever arm 25 by a joint 23; one arm of the two-armed lever 24 is operatively connected with the valve stem 22 of the inlet valve 12. The other arm of the two-armed lever 24 is operatively connected by way of a joint 26 with one end of a link 27 arranged parallel to the rocker lever arm 25. The other end of the link 27 is fixed at the bearing support 29 by a joint 28. The rocker lever arm 25 and link 27 form a parallelogram for the rectilinear guidance of the two-armed lever 24 so that with a valve actuation both inlet valves 12 and 13 are opened to the same stroke.

Figure 2:
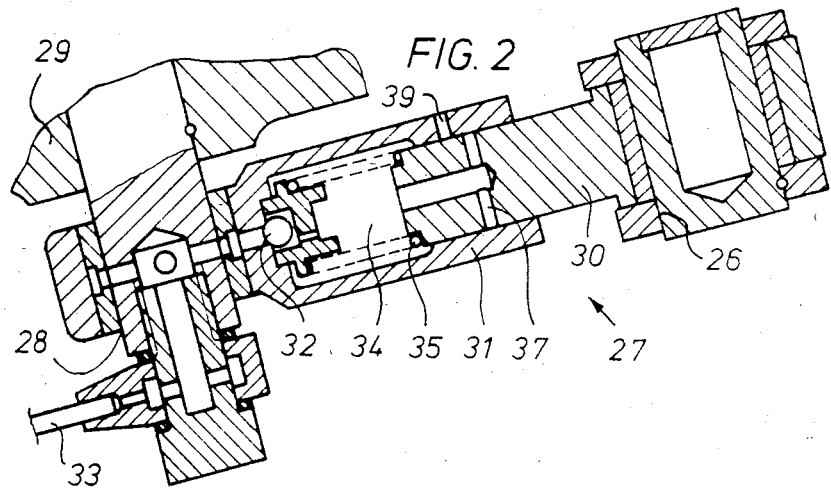
FIG. 2 is a longitudinal cross-sectional view, on an enlarged scale, through the adjusting mechanism, taken along line II—II of FIG. 1.

A valve control is illustrated in FIGS. 1 and 2 in which a valve-adjusting mechanism consisting of a piston cylinder- unit forms the stem of the link 27. The stem part of the link 27 which is pivotally connected at the two-armed lever 24 by means of the joint 26, is thereby constructed as piston 30 and the stem part of the link 27 operatively connected with the bearing support 29 by way of the joint 28, is constructed as cylinder 31.

Figure 3:
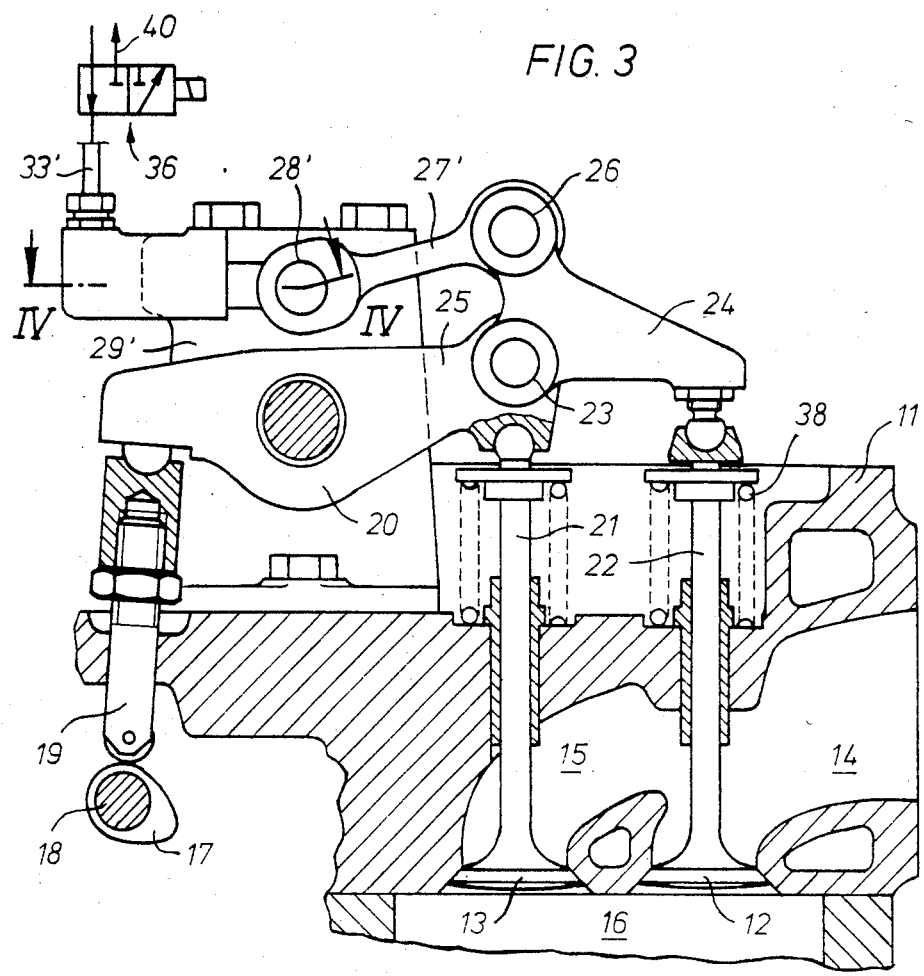
FIG. 3 is a cross-sectional view through a cylinder head with an adjustable link joint in accordance with the present invention.
Figure 4:
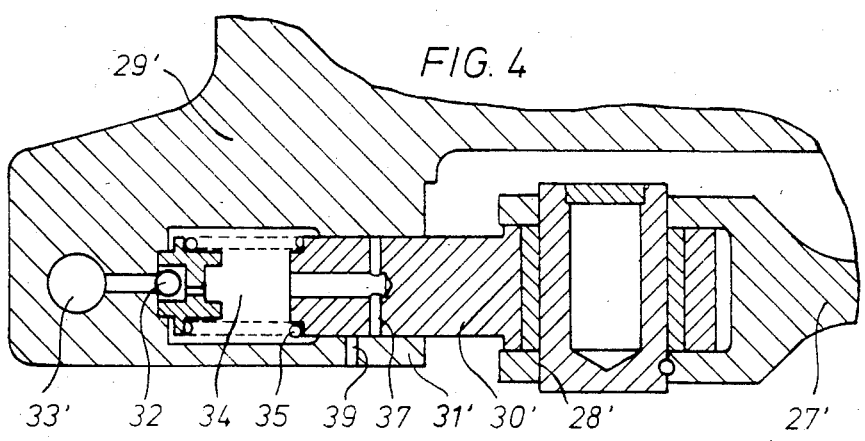
FIG. 4 is a longitudinal cross-sectional view, on an enlarged scale, through the adjusting mechanism taken along line IV—IV of FIG. 3.

The valve control illustrated in FIGS. 3 and 4 is nearly identical with the arrangement according to FIGS. 1 and 2. For that reason, the same reference numerals are used far-reachingly and for differing parts in FIGS. 3 and 4, the corresponding primed reference numerals are used. The sole difference resides in the placement of the adjusting mechanism which in the second example is not arranged as component of the link 27 between joints 26 and 28 but is disposed between joint 28' and bearing support 29'. The cylinder 31' of the adjusting mechanism according to FIGS. 3 and 4 is fixed (stationary) and a component of the bearing support 29'. The piston 30' which is slidingly guided in the cylinder 31', is seated at the free end of the joint 28' for the link 27' constructed with fixed length. The internal construction of the valve-adjusting mechanism is similar in both embodiments.

A cylinder space 34 which is present between pistons 30, 30' and cylinders 31, 31' is connected by way of a ball check valve 32 and bores with the pressure oil feed line 33, 33' which is controlled by the controllable closure device generally designated by referee numeral 36. A relief channel 37 is arranged in the piston 30, 30', which terminates at a distance from the cylinder opening in the gap formed between the piston 30, 30' and the cylinder 31, 31'. A weak compression spring 35 is arranged in the cylinder space 34 which, with a pressureless cylinder space 34, takes care for a continuing contact between the twoarmed lever 24 and the valve stem 22.

The operation of the two embodiments is similar. With an opened closure device 36, the cylinder space 34 fills with pressure oil, for example, from the lubricating oil supply of the four-cycle internal combustion engine. A play-free or clearance-free contact between the two-armed lever 24 and the valve stem 22 is achieved thereby. If now the valve actuation is set into motion starting from the cam 17 for carrying out a valve stroke, the ball check valve 32 closes by reason of the increasing pressure in the cylinder space 34. This pressure increase results from the fact that the valve closure spring 38 of the inlet valve 12 seeks to push the piston 30, 30' into the cylinder 31, 31' by way of the two-armed lever 24 which, however, is prevented by the oil filling in the cylinder space 34. Pressure oil which exits into the valve control space by way of the relief channel 37 and the gap between piston 30, 30' and cylinder 31, 31', is always replenished in the rest phases of the valve actuation from the pressure oil feed line 33, 33'.

If the closing device 36 is now brought into the closing position, the replenishing of pressure oil is interrupted. The pressure oil feed line 33, 33' becomes pressureless by way of the opened relief opening 40, as a result of which the ball check valve 32 of all valveadjusting mechanisms connected to the pressure oil feed line 33, 33' close instantaneously by reason of the predominant pressure in the cylinder spaces 34. From this instant, the piston 30, 30' is pressed into the cylinder 31, 31' by the feedback action of the valve closure spring 38 described above during the following valve actuation and pressure oil is displaced thereby into the valve control space by way of the relief bore 37 and the gap between piston 30, 30' and cylinder 31, 31'. As soon as the piston 30, 30' has entered a small distance into the cylinder 31, 31', the relief channel 37 comes into alignment with the relief opening 39 in the wall of the cylinder 31, 31' so that the oil which continues to be under residual pressure in the cylinder space 34, is suddenly relieved. Since no pressure oil is resupplied from the pressure oil feed line 33, 33', the cylinder space 34 is without pressure after the second valve actuation. The support of the two-armed lever 24 at the joint 26 by way of the link 27, 27' by the oil cushion in the cylinder space 34 is thereby no longer present. If a valve actuation now takes place with a pressureless cylinder space 34, then the inlet valve 13 is opened by the downwardly moving rocker lever arm 25. However, the inlet valve 12 remains closed under the effect of the valve closure spring 38 because the supporting oil cushion in the cylinder space 34 is missing. By sliding piston 30, 30' and cylinder 31, 31' one into the other, the rectilinear guidance for the two-armed lever 24 is interfered with. As a result thereof, the two-armed lever 24 carries out a rotation about the joint 23 whereby the joint 26 is displaced in the direction toward the link 27, 27'.

The actuation of the closure device 36 takes place in dependence on the load of the four-cycle internal combustion engine. With a large load, when the air mass flow rate is large, a pressure oil feed line 33, 33' is kept open so that both inlet valves 12 and 13 open during each valve actuation. During load conditions with a small air mass flow rate, the supply of pressure oil is interrupted by the closure device, and the pressure oil feed line 33 33' is relieved so that the inlet valve 12 remains closed. The rotary movement of the air about the cylinder axis produced in the combustion space 16 by the inlet valve 13 and the section 15 of the inlet channel, which is very prone to disturbance by reason of the small participating air mass, is now no longer interfered with by the valve disk of the inlet valve 12. The fuel preparation in the combustion space 16 is thereby considerably improved during this operating condition.

For shifting back to two-valve operation, the pressure oil feed line 33, 33' is again opened at the closure device 36. The cylinder space 34 is then filled with pressure oil after a few valve actuations so that the support action of the oil cushion on the link 27, 27', is again fully effective.

The embodiments described and illustrated herein do not represent the only applicability of the present invention. Any valve actuation common for two inlet valves can be equipped with the arrangement according to the present invention by the integration or interconnection of the adjusting mechanism.

The embodiment according to FIGS. 3 and 4 offers additionally the special advantage that the adjusting mechanism is not a component of the oscillating masses displaced during valve actuation.

While we have shown and described only two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A valve control for a supercharged four-cycle internal combustion engine in which each cylinder head includes two inlet valves operable to control an inlet channel system that imparts during the suction stroke a rotary movement about the cylinder longitudinal axis to the air flowing into the combustion space, valve-actuating means common to both inlet valves including a cam shaft, a cam on the cam shaft and adjusting means for the valve clearance compensation of the inlet valves, the adjusting means for at least one of the inlet valves per cylinder head having a piston-cylinder-unit fed with pressure oil, a pressure oil feed line for said last-mentioned adjusting means, controllable closure means arranged in said pressure oil feed line, and the piston and cylinder of the last-mentioned adjusting means exhibiting relative displaceability in case of a pressureless cylinder space which, matched to the kinematics of the valve-actuating means, precludes opening of the inlet valve coordinated to said last-mentioned adjusting means said valve-actuating means further includes a rocker lever means having a rocker lever arm, a two-armed lever operatively connected with the rocker lever means and the end of the valve stem of the at least one inlet valve, rectilinear guide means including said rocker lever arm and link means having a stem, said two-armed lever cooperating with said rectilinear guide means, and the piston and cylinder of the adjusting means forming the stem of said link means.

2. A valve control according to claim 1, wherein the the valve-actuating means includes a rocker lever means having a rocker lever arm, a two-armed lever operatively connected with the rocker lever means and the end of the valve stem of the at least one inlet valve, and rectilinear guide means including said rocker lever arm and line means, the cylinder of the adjusting means being fixedly connected with the cylinder head and the piston of the adjusting means including a joint of the link means.

3. A valve control according to claim 1, wherein a controllable closure means is arranged in the pressure oil feed line common for several valve-actuating means.

4. A valve control according to claim 3, wherein the closure means in the closure position opens up a relief opening for the section of the pressure oil feed line between closure means and a check valve.

5. A valve control according to claim 4, wherein a relief opening which discharges into a valve control space, is arranged in the wall of the cylinder and is controlled by the piston.

6. A valve control according to claim 5, wherein a relief channel is arranged in the piston which, in a predetermined stroke position of the piston, cooperates with the relief opening in the wall of the cylinder.

7. A valve control according to claim 6, wherein the valve-actuating means includes a rocker lever means having a rocker lever arm, a two-armed lever operatively connected with the rocker lever means and the end of the valve stem of the at least one inlet valve, rectilinear guide means including said rocker lever arm and link means having a stem, said two-armed lever cooperating with said rectilinear guide means, and the piston and cylinder of the adjusting means forming the stem of said link means.

8. A valve control according to claim 6, wherein the the valve-actuating means includes a rocker lever means having a rocker lever arm, a two-armed lever operatively connected with the rocker lever means and the end of the valve stem of the at least one inlet valve, and rectilinear guide means including said rocker lever arm and line means, the cylinder of the adjusting means being fixedly connected with the cylinder head and the piston of the adjusting means including a joint of the link means.

9. A valve control according to claim 1, wherein a controllable closure means is arranged in the pressure oil feed.

10. A valve control according to claim 9, wherein the closure means in the closure position opens up a relief opening for the section of the pressure oil feed line between closure means and a check valve.

11. A valve control according to claim 9, wherein a relief opening which discharges into a valve control space, is arranged in the wall of the cylinder and is controlled by the piston.

12. A valve control according to claim 11, wherein a relief channel is arranged in the piston which, in a predetermined stroke position of the piston, cooperates with the relief opening in the wall of the cylinder.

13. A valve control according to claim 1, wherein a relief opening which discharges into a valve control space, is arranged in the wall of the cylinder and is controlled by the piston.

* * * * *